Sept. 15, 1925. Re. 16,164

C. S. HALL

AIRCRAFT

Original Filed May 16, 1922 2 Sheets-Sheet 1

INVENTOR.
CHARLES S. HALL
BY B. J. Craig
ATTORNEY.

Sept. 15, 1925. Re. 16,164

C. S. HALL

AIRCRAFT

Original Filed May 16, 1922 2 Sheets-Sheet 2

INVENTOR.
CHARLES S. HALL
BY B. F. Craig
ATTORNEY.

Reissued Sept. 15, 1925. Re. 16,164

UNITED STATES PATENT OFFICE.

CHARLES S. HALL, OF OAKLAND, CALIFORNIA.

AIRCRAFT.

Original No. 1,515,037, dated November 11, 1924, Serial No. 561,378, filed May 16, 1922. Application for reissue filed January 31, 1925. Serial No. 6,130.

*To all whom it may concern:*

Be it known that I, CHARLES S. HALL, a citizen of the United States of America, a resident of Oakland, in the county of Alameda and State of California, have invented a new and useful Improvement in Aircraft, of which the following, when read with reference to the accompanying drawings, is such a full, clear, and exact specification embodying the invention in its preferred form as will enable others skilled in the art to which it appertains to make and use the same.

The general object of my invention is to provide a lighter than air craft with means to receive, house and discharge an airplane.

One of the objects of my invention is to provide a cooperative combination of lighter than air and heavier than air aircraft whereby a smaller aircraft such as an airplane may be housed within the larger craft and this larger craft used as a base of operations for the smaller craft.

Another object of my invention is to provide a lighter than air aircraft whereby a smaller craft such as an airplane may land upon, and be stored within, as well as to be able to take off from, the heavier than air craft.

Another object of my invention is to provide a "mother" aircraft adapted to carry and house a smaller craft wherein the "mother" ship can both take off and land with the smaller craft aboard so that a relatively small field may be used since the "mother" ship may make a landing when making but little headway.

Another object of my invention is to provide an aircraft which is particularly serviceable during times of war, being capable of long and sustained flight and providing housing facilities for smaller and auxiliary craft.

Another object is to provide an aircraft having a relatively flat under surface to give the craft large carrying capacity as is required for commercial, military, and naval uses.

Figure 1:
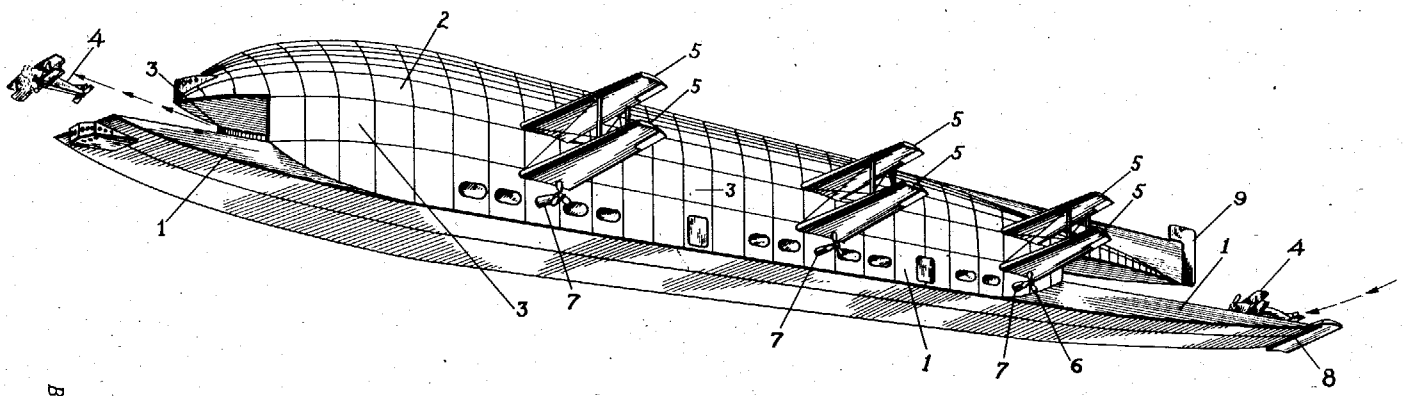
Figure 2:
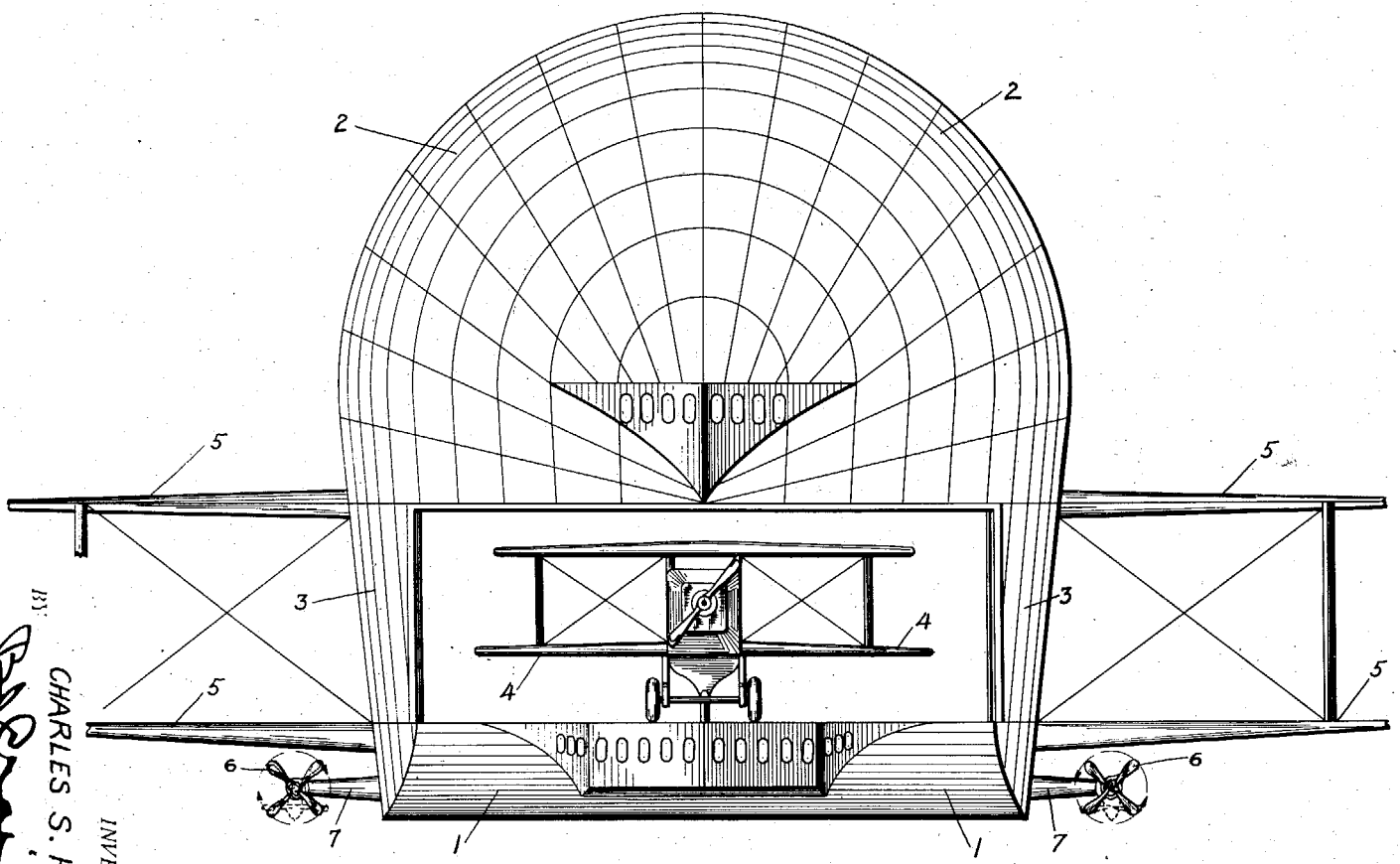

Other objects of my invention will be apparent from the following description taken in connection with the accompanying drawings wherein Fig. 1 is a perspective view of an aircraft embodying the features of my invention; Fig. 2 is a front elevation of the air craft showing an airplane housed within the "mother" craft.

In carrying out my invention, a suitable body 1 is provided. This body is suspended from a gas containing envelope 2. Between body 1 and envelope 2, side walls 3 are arranged as shown. These walls may be constructed so as to be filled with a suitable lighter than air element, such as is used within the envelope 2. The upper part of said body 1 forms the floor of a runway upon which smaller aircraft, such as an airplane 4, may land, rest, and take off, with the lower part of the envelope 2 forming a ceiling for the housing runway, as shown in Fig. 2.

On both sides of the aircraft, suitable planes, or wings 5 are arranged. Suitable propellers 6 are arranged operatively on outstanding pivoting cases 7, as shown in the drawings. These cases 7 are so arranged upon the body 1 (by means not shown in detail) whereby they may be swung upon their axes thus allowing the propellers to rotate about axes at right angles to the axes of the cases 7. Thus it will be seen that the propellers may be swung to exert a thrust in any desired direction. Suitable controls, such as rudders and elevators 8 and 9 may be constructed upon either the envelope 2 or the body 1.

It will be seen from the foregoing that when the envelope 2 is filled with a suitable lighter than air element, such as hydrogen, or helium, the buoyancy created thereby will tend to, if not actually lift the aircraft from the ground. If, however, additional lifting force is necessary, this may be accomplished by swinging the pivoted casings 7 in such a way that the propellers thereon will exert a thrust in a downward direction. It will be seen, that when the aircraft is in the air, a smaller aircraft such as an airplane 4 will be in a position to make a take-off at any time from the floor of the chamber defined by the ceiling formed by the lower surface of envelope 2, and the side walls 3 and the top of body 1, as hereinbefore described, and that, by reason of the runway thus afforded, the take off of the smaller craft 4 may be facilitated. The landing of the smaller aircraft 4 on the runway of the "mother" ship will be observed at the rear end of the aircraft as shown in Figure 1.

It will thus be seen that in the device described a craft is provided which can carry heavy loads, and thus satisfy one of the objects of the present invention.

Of course, it will be understood that various changes can be made in the relative size and shape of the various parts without departing from the spirit of the invention and I wish it to be understood that I do not limit myself to the details shown since the embodiment shown in the drawings is merely for the purpose of illustrating my invention. Other types of construction may be had, such as by placing the runway between two or more envelopes arranged on the same horizontal parallels or in any other suitable way, since my invention relates to means whereby a smaller aircraft may be landed upon, housed in, and may take the air from a "mother" aircraft.

Having thus described my invention, I claim:

1. In an aircraft the combination of; a gas container; wings attached to the said container; a platform, suitable to the landing and taking off of smaller aircraft, arranged longitudinally through the said container; a relatively flat body arranged under the said container; revolvable propeller frames extending from the said craft; propellers operatively mounted upon said frames; and controls mounted upon the said craft, substantially as described.

2. In an aircraft the combination of; a gas containing envelope; a relatively flat body attached thereto; a runway arranged longitudinally through the said craft, the said runway suitably arranged for the landings and takings off of smaller aircraft; a housing space for smaller aircraft arranged within the said body; wings attached to the said envelope and the said body; revolving propeller frames extending from the said body; propellers mounted upon said frames; and controls mounted upon the said body, substantially as disclosed.

3. In an aircraft of the combination; a gas container; wings attached thereto; revolving propeller casing arranged thereon; propellers operatively mounted upon the said casing; a runway arranged within the said aircraft suitable for the landings and takings off of smaller aircraft; a body of relatively flat undersurface; and suitable controls mounted upon the said craft, substantially as disclosed.

4. In an aircraft the combination of a gas container; a body arranged to the said container, the said body having a relatively flat undersurface; a platform arranged between the said gas container and the said body, the said platform suited for the landings thereon and takings off thereof of smaller aircraft; propeller casings arranged upon the said body, the said propeller casing rotatably journaled in the said body; propellers operatively mounted in the said casings; and controls arranged on the said body, substantially as shown.

5. An aircraft having a chamber therein, means for housing a smaller aircraft therein, means for landing smaller aircraft thereon and means for the taking off of a smaller aircraft therefrom, all of said means being connected by a runway.

6. In an aircraft the combination of a gas containing envelope, an enclosed runway supported by said container, said runway projecting beyond the end of the aircraft, the said runway affording a landing space for smaller aircraft, a space within which the smaller aircraft may be housed, and means permitting the smaller aircraft to take off.

7. In an aircraft the combination of, a gas containing envelope, a runway extending longitudinally of the envelope, one end of said runway having an open top projecting beyond the end of the aircraft whereby airplanes may land thereon and a housing space for smaller aircraft arranged within the said envelope.

8. In an aircraft the combination of, a gas containing envelope, a body thereon, a runway extending longitudinally of the said craft, said runway being suitably arranged for the landing and taking off of smaller aircraft, a housing space for smaller aircraft arranged within the said body, revolving propeller frames on said body and propellers mounted upon said frames.

9. In an aircraft the combination of, a lighter-than-air aircraft and a heavier-than-air aircraft, said lighter-than-air aircraft having means thereon whereby the heavier-than-air aircraft may be housed therein and a runway at one end whereby the heavier-than-air aircraft may make a landing upon and take off from the lighter-than-air aircraft while the latter is in motion.

10. In an aircraft the combination of, a gas container, a body arranged on the said container, a platform arranged within the said body, the said platform being smooth whereby it may be used for the landing thereon and taking off therefrom of smaller aircraft, propellers mounted upon the said body, the said propellers being arranged to exert a downward thrust, substantially as shown.

11. In an aircraft, a body including a sustaining gas container, driving means and steering means therefor, a landing platform on one end of said body, a second platform at the other end of said body, a chamber in said body and a runway connecting said chamber with said platforms.

12. In a heavier-than-air aircraft, a sustaining body having means therein for driving it and for steering it, said body having a landing platform thereon projecting beyond one end thereof, said body having a chamber therein for housing airplanes and a runway extending from said landing platform to said chamber.

13. In an aircraft, a body including a gas containing envelope, propellers arranged on said body, means to direct said aircraft vertically and laterally, said aircraft having a chamber therein, said chamber terminating at one end of said aircraft, a landing platform for airplanes adjacent the end of said chamber, said landing platform having a runway thereon and said chamber having a runway therein, said runways communicating whereby an airplane landing upon the landing platform may be moved into the chamber.

In testimony whereof, I hereunto affix my signature.

CHARLES S. HALL.